(12) United States Patent
Morris et al.

(10) Patent No.: US 6,243,231 B1
(45) Date of Patent: Jun. 5, 2001

(54) DISK CARTRIDGE WITH ANTI-RATTLE MECHANISM

(75) Inventors: Frank Morris, San Jose; Hans Tannert, Cupertino, both of CA (US)

(73) Assignee: Syquest Technology, Fremont, CA (US)

( * ) Notice: Subject to any disclaimer, the term of this patent is extended or adjusted under 35 U.S.C. 154(b) by 0 days.

(21) Appl. No.: 08/978,290

(22) Filed: Nov. 25, 1997

(51) Int. Cl.$^7$ ...................................................... G11B 23/03
(52) U.S. Cl. ............................................................ 360/133
(58) Field of Search ............................... 360/133; 369/291

(56) References Cited

U.S. PATENT DOCUMENTS

| | | | | |
|---|---|---|---|---|
| 5,535,081 | * | 7/1996 | Nelson et al. | 360/133 |
| 5,650,899 | | 7/1997 | Schick et al. | 360/133 |
| 5,862,026 | * | 1/1999 | Schick et al. | 360/133 |
| 5,974,026 | * | 10/1999 | Guerini | 369/291 |
| 5,991,130 | * | 11/1999 | Schick et al. | 360/133 |
| 6,011,773 | * | 1/2000 | Guerini et al. | 369/291 |

FOREIGN PATENT DOCUMENTS 696800 2/1996 (EP) .

* cited by examiner

*Primary Examiner*—George J. Letscher
(74) *Attorney, Agent, or Firm*—Burns Doane Swecker & Mathis LLP

(57) ABSTRACT

An anti-rattle mechanism for a disk cartridge addressing the problems of particulate generation which occur in disk cartridges when a disk assembly moves around inside the cartridge contacting the cartridge walls. The anti-rattle mechanism includes an anti-rattle ring which is movable by a cam surface between a clamping position and a released position. When the disk cartridge is outside of a disk drive, the anti-rattle mechanism is in a clamping position to completely or partially captivate the disk assembly within the cartridge. As the disk cartridge is inserted into the disk drive, the anti-rattle mechanism moves to a released configuration where a disk is freely rotatable within the cartridge. The anti-rattle mechanism is moved between the clamping position and the released position by rotation of a movable door.

14 Claims, 4 Drawing Sheets

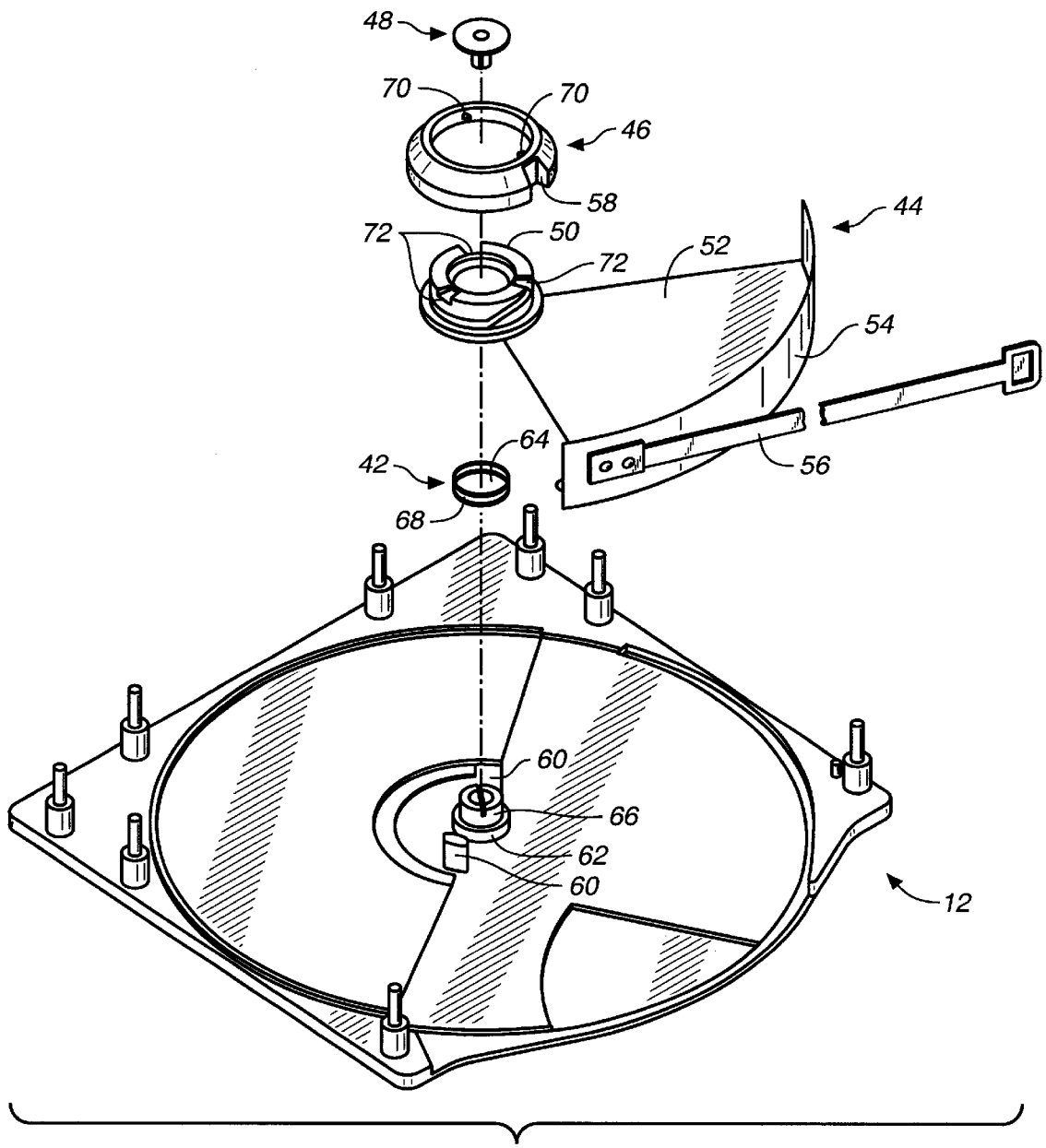
FIG._1

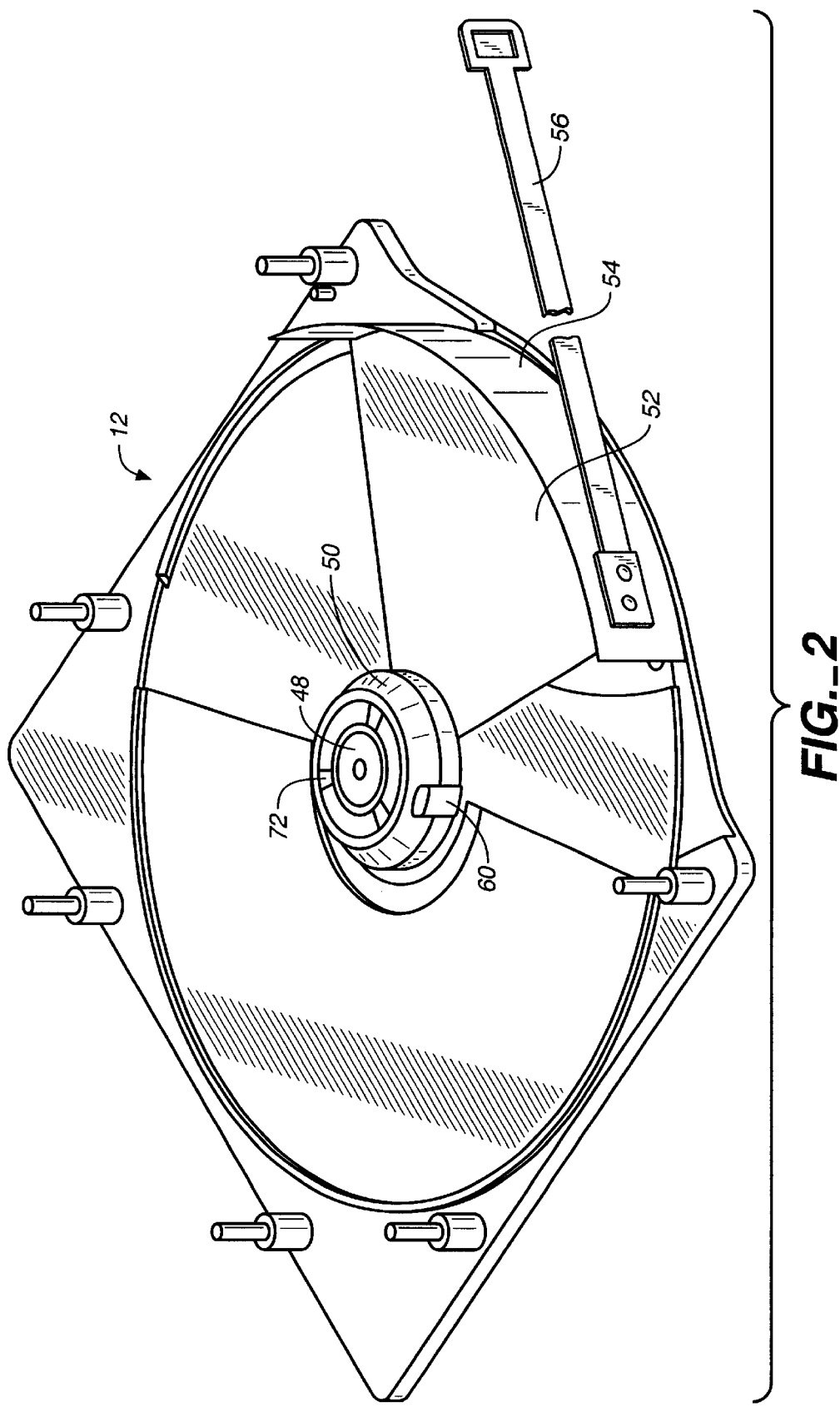
FIG._2

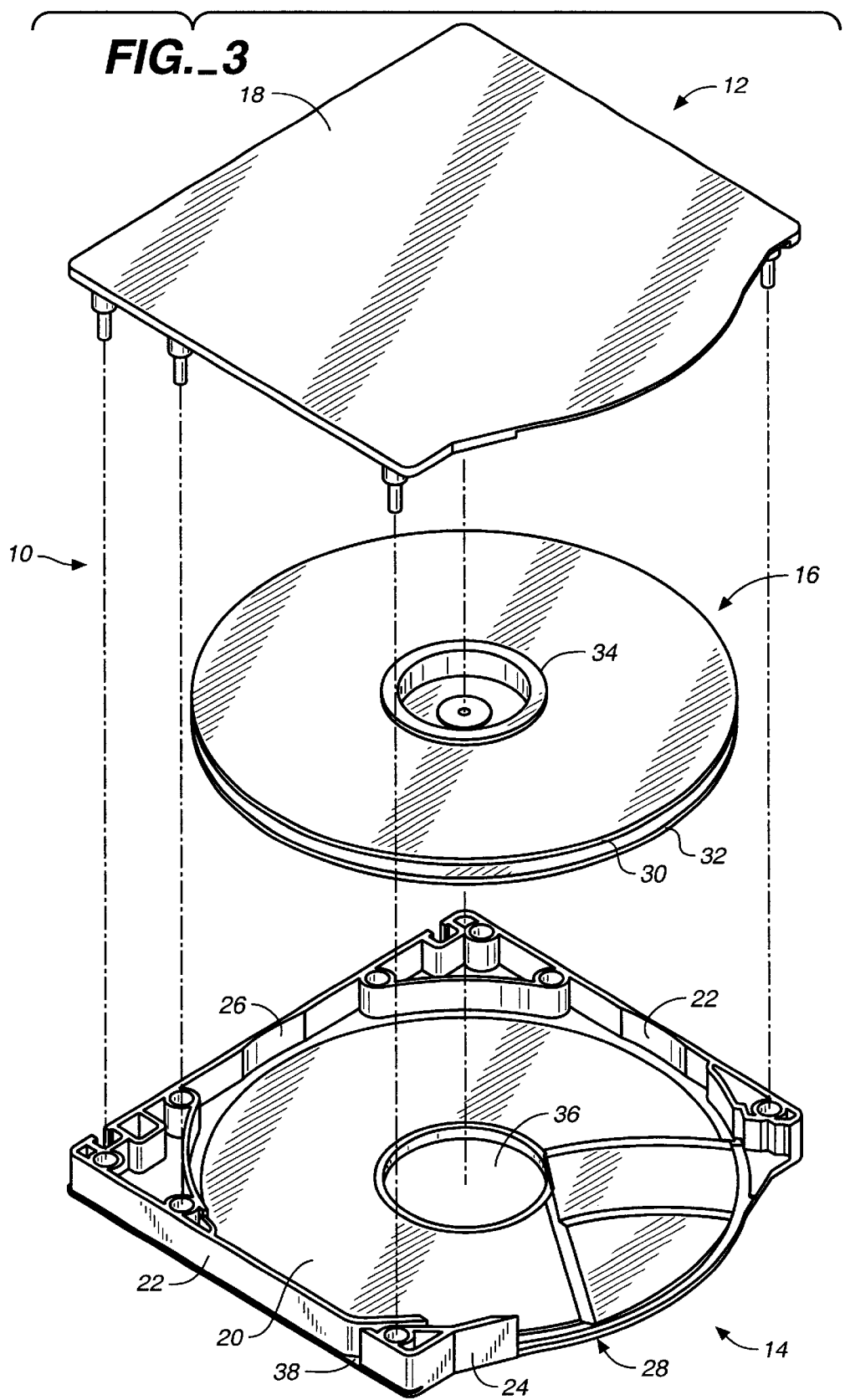

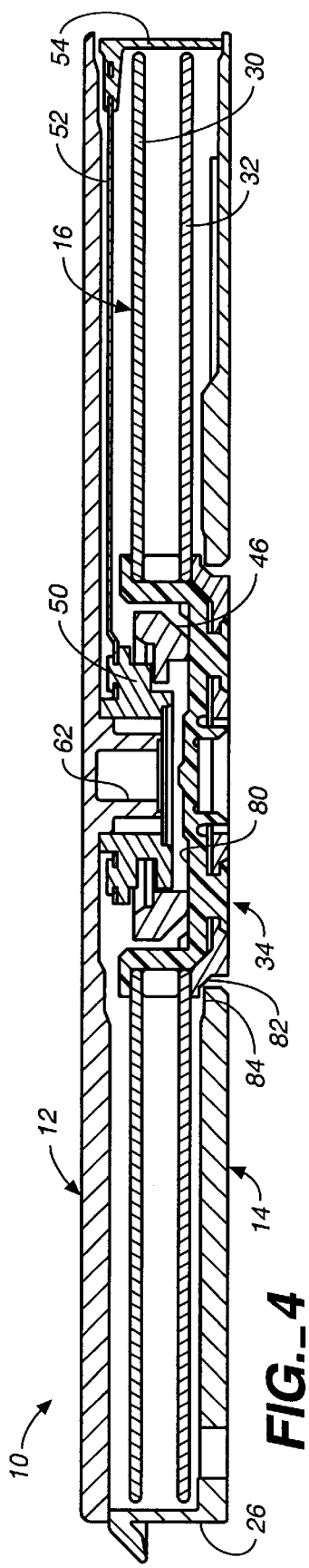
FIG._4
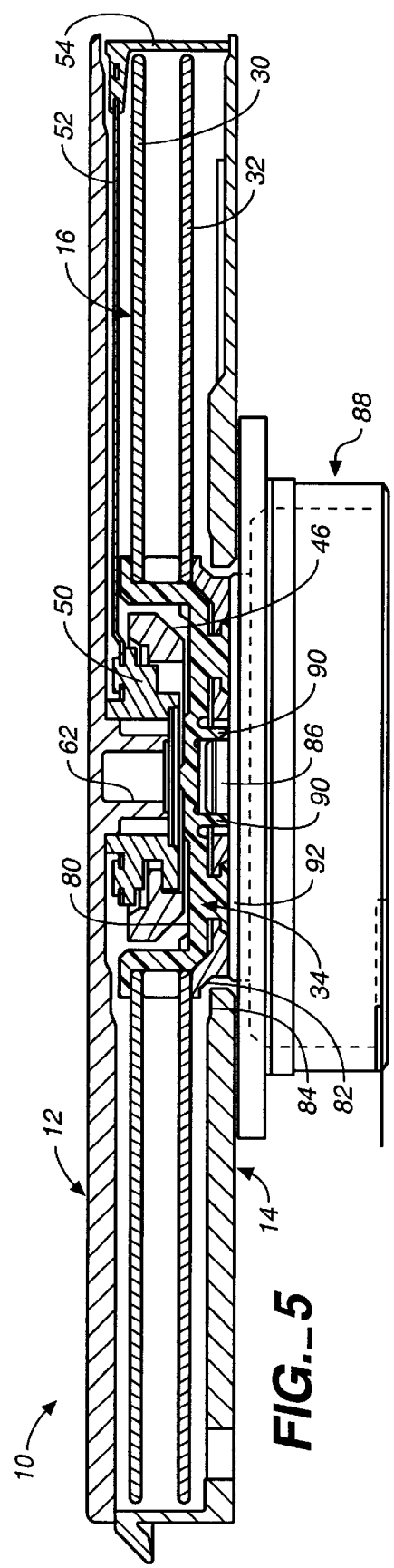
FIG._5

DISK CARTRIDGE WITH ANTI-RATTLE MECHANISM

BACKGROUND OF THE INVENTION

1. Field of the Invention

The invention relates to a disk cartridge assembly for data storage, and more particularly, to a disk cartridge with an anti-rattle mechanism.

2. Brief Description of the Related Art

Data storage disk systems employing removable disk cartridges are generally used to add additional hard drive storage to a computer system or to provide backup storage capacity. The disk cartridges may contain either a single disk or more than one disk each having two recording surfaces. The disks within these disk cartridges are generally optical or magnetic disks of varying sizes and storage capacities.

Removable disk cartridges for storing digital electronic information typically include an outer cartridge or shell containing one or more rotatable storage medium or disk upon which electronic information is stored. The cartridge includes upper and lower cartridge members which are joined together to form a housing for the disk. The disk is mounted on a central hub assembly which holds the disk and allows the disk to rotate within the cartridge housing when data is being read from or written to the recording surfaces. When the disk cartridge is inserted into a disk drive, a spindle motor in the disk drive engages the disk hub in order to rotate the disk within the housing as a read/write head reads or writes data from or to recording surfaces of the disk.

The disk cartridge housing generally includes some form of an opening to provide the read/write head of the drive with access to the recording surfaces of the disk. A shutter or door mechanism is often provided which covers the cartridge opening when the cartridge is not in the disk drive to prevent damage to the recording surfaces of the disks. As the disk cartridge is inserted into the disk drive the door mechanism is opened by a door activator of the disk drive to allow access to the recording surfaces of the disk.

When the disk cartridge is seated inside the disk drive the disk is positioned within the cartridge with some running clearance between the disk and the cartridge side walls as well as between the disk and the cartridge top and bottom walls to prevent the disk from contacting the cartridge walls during rotation. However, this clearance allows the disk to move around within the cartridge when the cartridge is not in the disk drive. This motion of the disk within the cartridge may create undesirable debris and particulates which contaminate the recording surfaces of the disk.

Accordingly, it would be desirable to provide a disk cartridge with an anti-rattle mechanism to minimize motion of the disk within the cartridge when the disk is outside of the disk drive.

SUMMARY OF THE INVENTION

The present invention relates to a magnetic, optical, or other disk cartridge for data storage and an anti-rattle mechanism for reduction of particulate contamination created when the disk cartridge is outside of the disk drive and the disk moves around within the cartridge. The anti-rattle mechanism prevents one or more data storage disks from moving within the cartridge when the disk cartridge is not inserted in a disk drive.

In accordance with one aspect of the present invention, a disk cartridge includes a disk cartridge housing, a disk assembly positioned within the disk cartridge housing and including a data storage disk and a hub, an opening in the disk cartridge housing providing access of a read/write head to the data storage disk, and a door movable between a closed position in which the door covers the opening and an opened position. An anti-rattle mechanism in a clamping position prevents motion of the disk assembly within the housing. In a released position, the anti-rattle mechanism allows the disk assembly to rotate freely within the disk cartridge housing. The anti-rattle mechanism includes a first cam member rotatable with respect to the disk cartridge housing, and a second cam member arranged concentrically around the first cam member and movable between the clamping position and the released position in a direction parallel to an axis of rotation of the first cam member in response to rotation of the first cam member.

In accordance with a further aspect of the present invention, a disk cartridge includes a disk cartridge housing including an upper cartridge and a lower cartridge, a disk assembly positioned within the disk cartridge housing and including a data storage disk and a hub, the disk assembly having an axis of rotation, an opening in the disk cartridge housing providing access of a read/write head to the data storage disk, and a door movable between a closed position in which the door covers the opening and an opened position. An anti-rattle mechanism is movable in a direction parallel to the axis of rotation of the disk assembly between a clamping position in which motion of the disk assembly within the housing is prevented and a released position in which the disk assembly is freely rotatable within the disk cartridge housing. When the anti-rattle mechanism is in the clamping position the disk assembly is clamped against the disk cartridge housing causing outward deformation of the housing.

In accordance with an additional aspect of the invention, a disk cartridge includes a disk cartridge housing, a disk assembly positioned within the disk cartridge housing and including a data storage disk and a hub, an opening in the disk cartridge housing providing access of a read/write head to the data storage disk, and a door movable between a closed position in which the door covers the opening and an opened position. An anti-rattle mechanism is provided having a clamping position in which motion of the disk assembly within the housing is prevented and a released position in which the disk assembly is freely rotatable within the disk cartridge housing. The anti-rattle mechanism includes a cam member rotatable with respect to the disk cartridge housing and having at least one cam slot, and a cam follower having a pin for engagement with the cam slot, the rotation of the cam member causing the cam follower to move longitudinally from the clamping position to the released position and from the released position to the clamping position as the pin moves in the cam slot.

In a preferred embodiment, the present invention provides an anti-rattle mechanism for a disk cartridge addressing the problems of particulate generation which occur in disk cartridges when a disk assembly moves around inside the cartridge contacting the cartridge walls. The anti-rattle mechanism includes an anti-rattle ring which is movable by a cam surface between a clamping position and a released position. When the disk cartridge is outside of a disk drive, the anti-rattle mechanism is in a clamping position to completely or partially captivate the disk assembly within the cartridge. As the disk cartridge is inserted into the disk drive, the anti-rattle mechanism moves to a released configuration where a disk is freely rotatable within the cartridge. The anti-rattle mechanism is moved between the clamping position and the released position by rotation of a movable door.

The present invention provides advantages of reduced particulate contamination of a disk cartridge with a simple anti-rattle mechanism which captures a movable disk assembly against a side of the disk cartridge. The compliance provided by the disk cartridge housing prevents the need for a spring to provide compliance in the anti-rattle mechanism. Further, the arrangement of the anti-rattle mechanism in a concentric manner allows a small overall cartridge thickness.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 1 is an exploded perspective view of the anti-rattle mechanism according to the present invention;

FIG. 2 is a perspective view of the anti-rattle mechanism of FIG. 1 in an assembled configuration;

FIG. 3 is an exploded perspective view of a disk cartridge for use with the present invention;

FIG. 4 is a cross sectional side view of the disk cartridge with the anti-rattle mechanism a clamping position; and FIG. 5 is a cross section a side view of the of the disk cartridge mounted on the motor of the disk drive with the anti-rattle mechanism in a released position.

DETAILED DESCRIPTION OF THE PREFERRED EMBODIMENTS

The following describes an anti-rattle mechanism for a disk cartridge, where the mechanism is particularly adapted to overcome the problems of particulate generation which occur in disk cartridges when the disk moves around inside the cartridge contacting the cartridge walls. The particulates and debris which are generated due to a rattling disk contaminate the recording surfaces of the disk. When the disk cartridge is outside of a disk drive, the anti-rattle mechanism of the present invention is in a clamping position to completely or partially captivate the disk within the cartridge by clamping the disk against the disk cartridge housing and deforming the housing. As the disk cartridge is inserted into the disk drive, the anti-rattle mechanism moves to a released configuration where the disk is freely rotatable within the cartridge.

A disk cartridge 10 including an anti-rattle mechanism is illustrated in FIG. 3. The disk cartridge 10 includes an upper cartridge 12 and a lower cartridge 14 which are assembled to form a housing which encloses a disk assembly 16. The upper cartridge 12 forms a top wall 18 of the disk cartridge while the lower cartridge 14 forms a bottom wall 20, two side walls 22, a front wall 24, and a back wall 26 of the disk cartridge. The front wall 24 includes an front wall opening 28 to provide access of a read/write head to the disks. The front wall opening 28 is provided with a sliding door (not shown in FIG. 3) which will be described further with reference to FIGS. 1 and 2. The lower cartridge 14 also includes a slot 38 in one of the side walls 22 for receiving an actuator for the sliding door which covers the front wall opening 28 of the disk cartridge when the disk cartridge is outside of the disk drive. The upper cartridge 12 and the lower cartridge 14 are secured together by heat staking, adhesive bonding, or any other known method.

As shown in FIG. 3, the disk assembly 16 includes two disks 30, 32, and a hub 34 supporting the two disks in a spaced apart arrangement. The hub 34 is configured such that when the disk cartridge is inserted in a disk drive, the hub 34 is received on a magnetic chuck of the disk drive motor and the rotation of the disk drive motor causes the disks to rotate inside the cartridge. The bottom wall 20 of the lower cartridge 14 includes a central opening 36 through which the hub 34 is received on the disk drive motor for rotation of the disks 30, 32.

As shown in FIGS. 1 and 2, the anti-rattle mechanism is mounted on the upper cartridge 12 and operates in connection with the opening and closing of the sliding cartridge door assembly 44. The cartridge door is provided to cover the front wall opening 28 of the cartridge through which a read/write head accesses the disks 30, 32. It is to be noted that the assemblies of FIGS. 1 and 2 have been inverted from their proper orientation for ease of illustration.

As shown in FIG. 1, mounted on the upper cartridge 12 are a torsion spring 42, a door assembly 44, an anti-rattle ring 46, and a locking cap 48. The door assembly 44 includes a door hub 50 and a wedge shaped door arm 52 connecting a curved door member 54 which covers the front wall opening 28 to the door hub. The door arm 52 is fixed to the door hub 50 by heat staking or another known method. A flexible door actuator 56 is connected to the door member 54 for opening and closing the door.

The anti-rattle ring 46 moves up and down in a direction parallel to an axis of the ring between a clamping position and a released position. In the clamping position the anti-rattle ring 46 contacts the hub 34 of the disk assembly 16, shown in FIG. 3, and presses the hub of the disk assembly into contact with the bottom wall of the lower cartridge 14 to capture the disk assembly and minimize motion of the disk assembly with respect to the cartridge. In the captured position, the anti-rattle mechanism preferably deforms the upper or lower disk cartridge 12, 14 to ensure complete capture of the disk assembly 16. In the released position the anti-rattle ring 46 is retracted toward the upper cartridge 12 and the disk assembly 16 rotates freely within the cartridge.

The anti-rattle ring 46 includes one or more, and preferably two vertical slots 58 which receive corresponding stand offs 60 extending from the upper cartridge 12. The engagement of the vertical slots 58 of the anti-rattle ring 46 over the stand offs 60 allows the anti-rattle ring 46 to move longitudinally in an axial direction while preventing rotation of the anti-rattle ring on the upper cartridge 12.

The anti-rattle ring 46 also includes three pins 70 which protrude from an inner circumference of the ring. When the disk cartridge is assembled, the anti-rattle ring 46 functions as a cam follower with the three pins 70 received in three cam slots 72 provided in the door hub 50. Although the cam slots 72 have been illustrated as circumferential, angled slots, the clamping action can also be provided by cam surfaces on the door hub 50 which are not in the form of slots. The engagement of the pins 70 with the cam slots 72 of the door hub 50 causes the anti-rattle ring 46 to move axially between the clamping and released positions as the door assembly 44 is rotatably opened and closed.

An overall vertical dimension of a combination of the door hub 50 providing the cam surfaces and the anti-rattle ring 46 providing the cam followers is minimized by the arrangement of the anti-rattle ring coaxially surrounding the door hub in the released position. This reduction in the vertical or axial dimension of the door hub 50 leads to a substantially thinner disk cartridge 10. For example, the vertical dimension of door hub 50 and the anti-rattle ring in the clamping position is approximately 8 mm or less, preferably approximately 5.5 mm or less and in the released position is approximately 6 mm or less, preferably approximately 5 mm or less. This allows a total cartridge height of approximately 12 mm or less, preferably approximately 10 mm or less.

The door hub 50 is rotatably mounted on a central post 62 of the upper cartridge 12. The torsion spring 42 has a first end 64 which is fixed in a slot 66 in the central post 62 and a second end 68 which is fixed in a slot in the door hub 50. The torsion spring 42 bias the door assembly 44 toward the closed position shown in FIG. 2. To move the door assembly 44 from the closed position to the opened position, the door actuator 56 which extends through the side wall slot 38 is pulled from the exterior of the disk cartridge by a door opening mechanism in the disk drive. As the disk cartridge is removed from the disk drive the torsion spring 42 bias the door assembly 44 back to the closed position.

The locking cap 48 is used to secure the door assembly 44 and the anti-rattle ring 46 in place on the upper cartridge 12. The locking cap 48 is attached to the upper cartridge 12 by any suitable method, such as heat staking, ultrasonic welding, bonding, or the like.

FIGS. 4 and 5 are side cross sectional views of the disk cartridge 10 with the anti-rattle ring 46 in the clamping position in FIG. 4 and in the released position in FIG. 5 for rotation by the disk drive motor. In the clamping position, the anti-rattle ring 46 extends downward from the door hub 50 and engages an internal surface 80 of the disk assembly hub 34. This causes an angled lower edge 82 of the hub 34 to be pressed against a beveled inside edge 84 of the lower cartridge 14.

When the anti-rattle ring 46 is in the clamping position shown in FIG. 4, the cartridge housing is caused to deflect outward slightly. In a preferred embodiment of the invention, the upper cartridge 12 deforms outward when the anti-rattle ring 46 is in the clamping position. However, the lower cartridge 14 may also deflect.

According to a preferred embodiment, the engagement between the anti-rattle ring 46 and the hub 34 and between the hub flange 82 and the lower cartridge 14 completely captures the disk assembly 16 in place within the cartridge and prevents the disks 30, 32 from moving within the disk cartridge. However, due to manufacturing tolerances the anti-rattle ring 46 may only partially capture the disk assembly 16 inside the cartridge when in the clamping position. The small amount of motion which may be allowed by the anti-rattle ring 46 in the clamping position is substantially less than the amount of motion allowed without the ring and greatly reduces particulate generation. In addition, a tapered surfaces 82 of the hub 34 engages an inside corner 84 of the cartridge 14 opening during clamping providing a centering function and completely preventing the edges of the disks 30, 32 from touching the walls 22, 24, 26 of the cartridge when the anti-rattle ring 46 is in the clamping position even if the disk assembly 16 is not held completely fixed by the anti-rattle ring.

As shown in FIG. 5, when the door assembly 44 is opened by inserting the disk cartridge into a disk drive, rotation of the door hub 50 causes the anti-rattle ring 46 with the cam following pins 70 to move upward within the cartridge due to the cam action of the door hub slots 72. Once the disk cartridge is fully inserted into the disk drive, the hub 34 is received on a drive shaft 86 of the disk drive motor 88 with the hub supported on a magnetic chuck 92. A plurality of flexible fingers 90 of the hub 34 center the disk assembly 16 on the motor drive shaft 86. When the disk cartridge 10 is engaged within the disk drive the disk assembly 16 is supported within the cartridge without touching any of the walls or the top and bottom of the cartridge. Accordingly, when the disk assembly 16 is rotated no particulates are generated by contact between moving parts inside the disk cartridge.

The present invention provides the advantages of preventing rattle and the associated particulate generation with a compact and reliable anti-rattle mechanism. The anti-rattle mechanism employs only two parts, providing ease of manufacturing, improved reliability, and a small overall cartridge thickness.

While the invention has been described in detail with reference to the preferred embodiments thereof, it will be apparent to one skilled in the art that various changes and modifications can be made and equivalents employed, without departing from the present invention.

What is claimed is:

1. A disk cartridge comprising:
   a disk cartridge housing including an upper cartridge housing and a lower cartridge housing;
   a disk assembly positioned within the disk cartridge housing and including a ta storage disk and a hub, the disk assembly having an axis of rotation;
   an opening in the disk cartridge housing providing access of a read/write head to the data storage disk;
   a door movable between a closed position in which the door covers the opening and an opened position;
   an anti-rattle mechanism movable in a direction parallel to the axis of rotation of the disk assembly between a clamping position in which motion of the disk assembly within the housing is prevented and a released position in which the disk assembly is freely rotatable within the disk cartridge housing, wherein when the anti-rattle mechanism is in the clamping position the disk assembly is clamped against the disk cartridge housing causing outward deformation of the housing; and
   wherein the anti-rattle mechanism includes a non-rotatable anti-rattle ring surrounding a rotatable hub of the door, the anti-rattle ring and the rotatable hub forming a cam surface and a follower such that rotation of the door causes axial motion of the anti-rattle ring.

2. The disk cartridge according to claim 1, wherein the outward deformation of the housing is provided by the upper cartridge housing.

3. The disk cartridge according to claim 1, wherein motion of the door of the disk cartridge from an open position to a closed position causes the anti-rattle mechanism to move from the released position to the clamping position.

4. The disk cartridge according to claim 1, wherein the rotatable hub is rotatable with respect to the disk cartridge housing and has at least one cam slot; and
   wherein the anti-rattle ring has a pin for engagement with the cam slot, the rotation of the rotatable hub causing the anti-rattle ring to move longitudinally from the clamping position to the released position and from the released position to the clamping position as the pin moves in the cam slot.

5. The disk cartridge according to claim 4, wherein the anti-rattle ring has a lower contact surface which contacts the hub of the disk assembly in the clamping position and the lower contact surface of the anti-rattle ring is substantially co-planar with a lower surface of the rotatable hub in the released position.

6. The disk cartridge according to claim 4, wherein a combination of the rotatable hub and the anti-rattle ring has a height in the released position which is substantially equal to a height of the rotatable hub alone.

7. The disk cartridge according to claim 4, wherein the anti-rattle ring is a ring positioned concentrically around the cam member, the cam slot is formed in an exterior surface of the rotatable hub and the pin is formed at an interior surface of the anti-rattle ring.

8. The disk cartridge according to claim 4, wherein motion of the door from the open position to the closed position causes the anti-rattle mechanism to move from the released position to the clamping position.

9. The disk cartridge according to claim 1, wherein the anti-rattle ring is arranged concentrically around the rotatable hub and movable between the clamping position and the released position along an axis of rotation of the rotatable hub in response to rotation of the rotatable hub.

10. The disk cartridge according to claim 9, wherein the anti-rattle ring has a lower contact surface which contacts the hub of the disk assembly in the clamping position and the lower contact surface of the anti-rattle ring is substantially co-planar with a lower surface of the rotatable hub in the released position.

11. The disk cartridge according to claim 9, wherein a combination of the rotatable hub and anti-rattle ring has a height in the released position which is substantially equal to a height of the rotatable hub alone due to the concentric arrangement of the anti-rattle ring around the rotatable hub.

12. The disk cartridge according to claim 9, wherein the rotatable hub moves axially, and is non-rotatably fixed to the door by a door arm and the door rotates with the rotatable hub.

13. The disk cartridge according to claim 12, wherein motion of the door from an open position to a closed position causes the anti-rattle mechanism to move from the released position to the clamping position.

14. The disk cartridge according to claim 10, wherein the rotatable hub moves axially, and is non-rotatably fixed to the door such that motion of the door from the open position to the closed position causes the anti-rattle ring to move from the released position to the clamping position.

* * * * *